June 6, 1967   J. LONGOBARDI ET AL   3,323,597
BONDED COUNTERWEIGHT FOR BLADE OF ROTARY WING AIRCRAFT
Filed Feb. 1, 1965   3 Sheets-Sheet 1
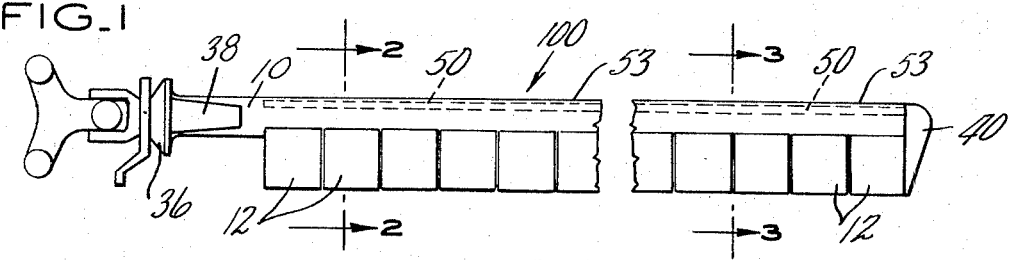
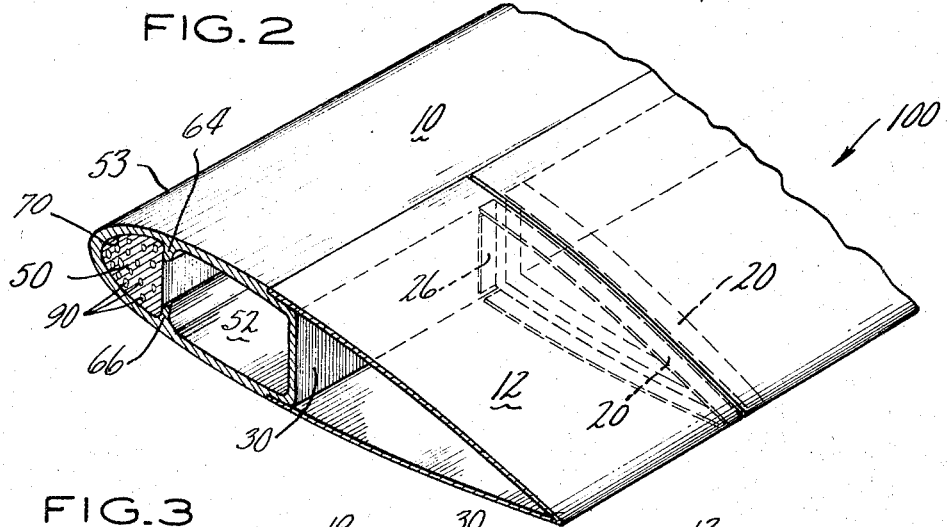
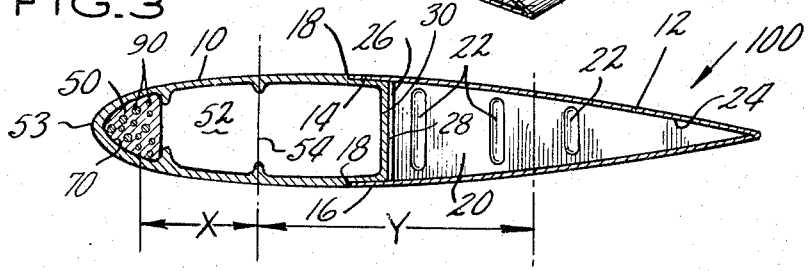
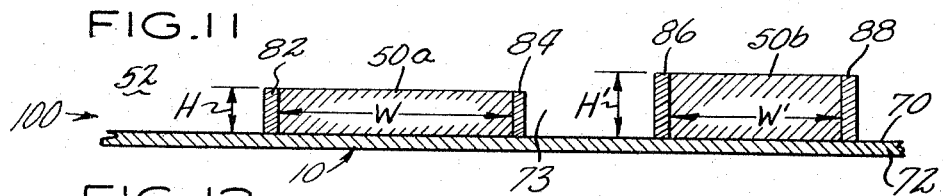
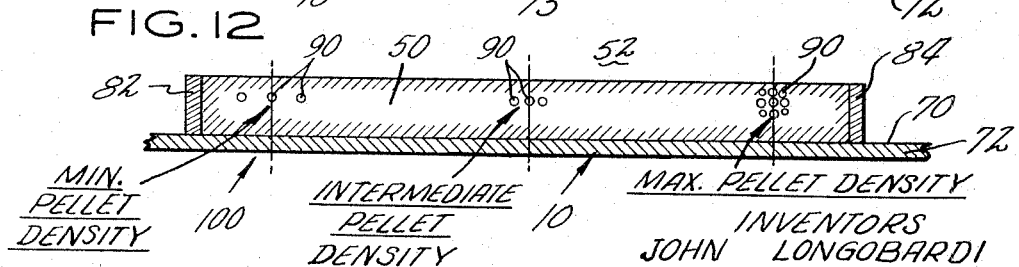
INVENTORS
JOHN LONGOBARDI
DONALD P. NEVERTON
BY Vernon F. Hauschild
ATTORNEY

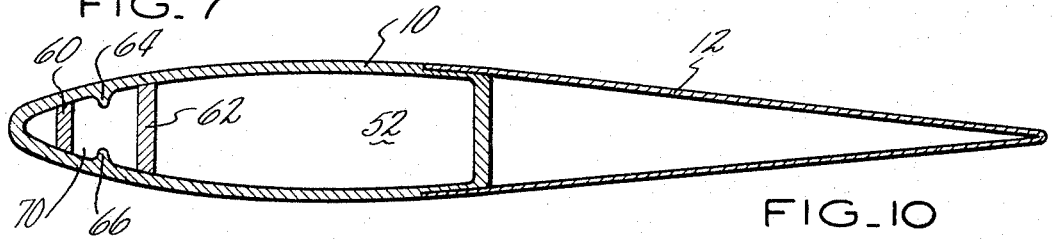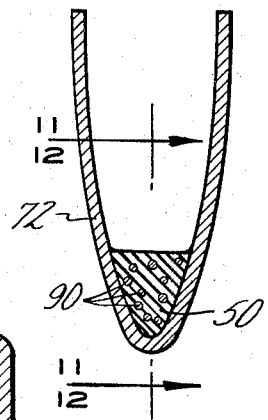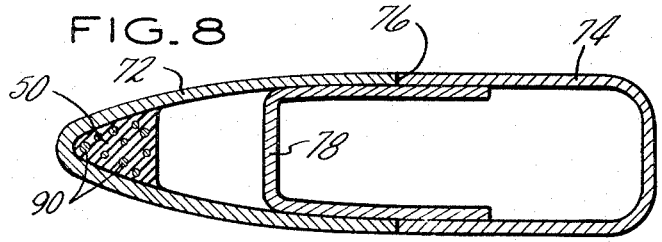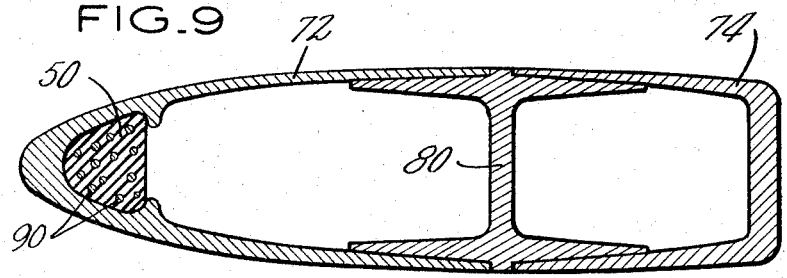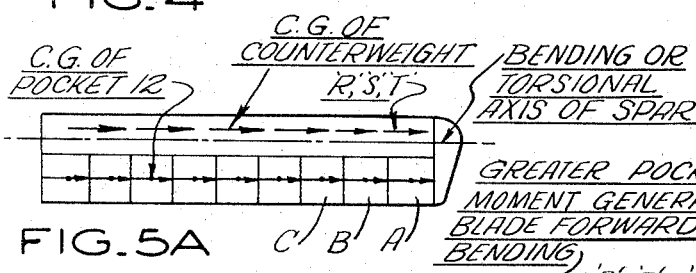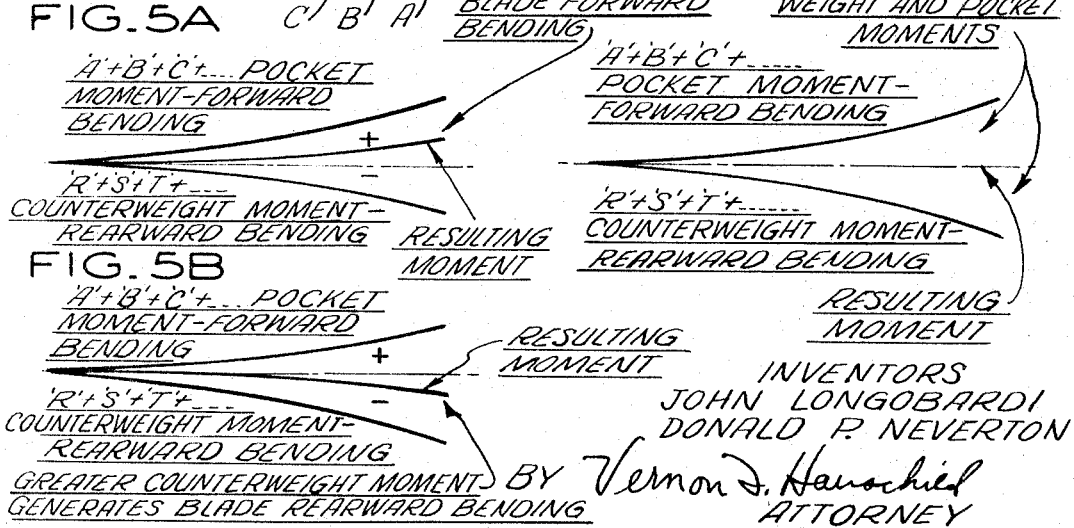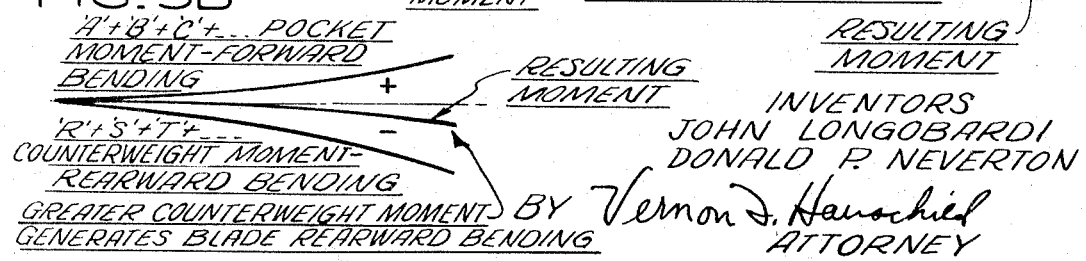

June 6, 1967  J. LONGOBARDI ETAL  3,323,597
BONDED COUNTERWEIGHT FOR BLADE OF ROTARY WING AIRCRAFT
Filed Feb. 1, 1965  3 Sheets-Sheet 3

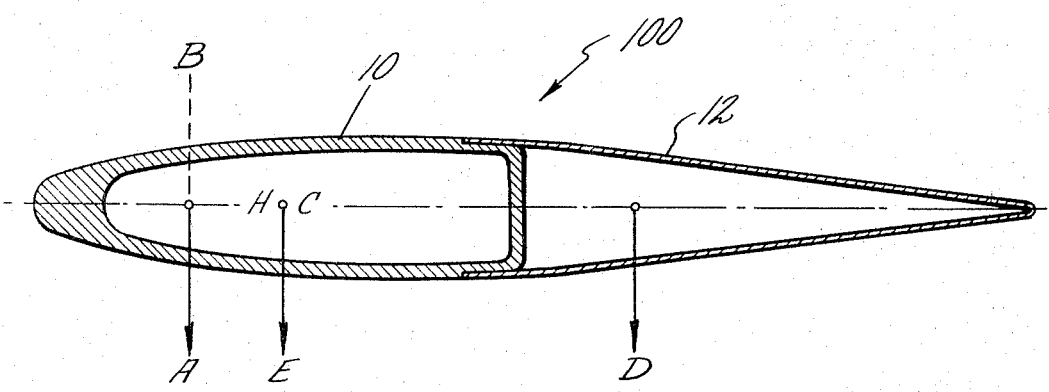

FIG.14

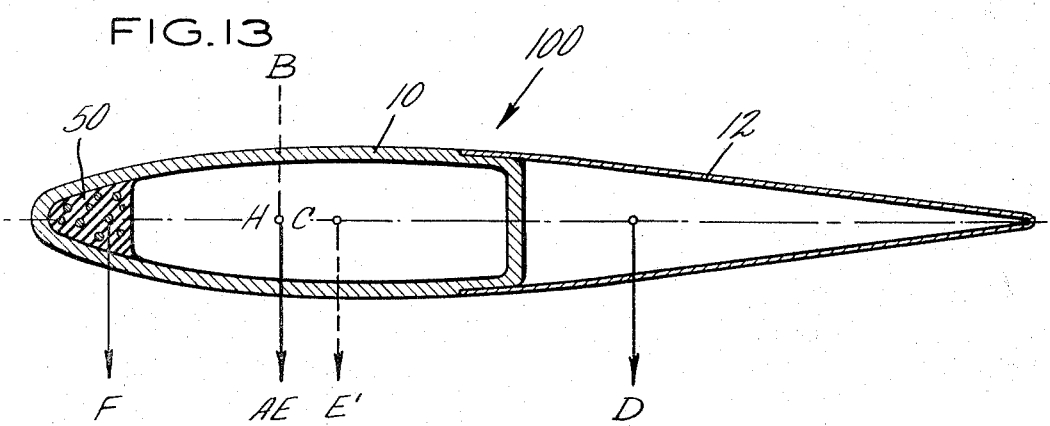

FIG.13

A = CENTER OF GRAVITY OF SPAR
B = BENDING AXIS OF SPAR
C = AERODYNAMIC CENTER OF BLADE
D = CENTER OF GRAVITY OF POCKETS
E = CENTER OF GRAVITY OF BLADE
F = CENTER OF GRAVITY OF NON-
    STRUCTURAL BALANCE WEIGHTS
H = FEATHERING AXIS OF BLADE

INVENTORS
JOHN LONGOBARDI
DONALD P. NEVERTON
BY Vernon J. Hauschild
ATTORNEY

United States Patent Office
3,323,597
Patented June 6, 1967

3,323,597
BONDED COUNTERWEIGHT FOR BLADE OF ROTARY WING AIRCRAFT
John Longobardi, Woodbridge, Conn., and Donald P. Neverton, Williamsburg, Va., assignors to United Aircraft Corporation, East Hartford, Conn., a corporation of Delaware
Filed Feb. 1, 1965, Ser. No. 429,408
21 Claims. (Cl. 170—159)

This invention relates to improvements in rotary wing aircraft and particularly to improvements in blades for such aircraft of the type in which a spar forms the leading edge and main strength member of the blade and conforms to the airfoil contour of the blade throughout a substantial chordwise portion thereof. In rotor blades of this general type the chordwise airfoil contour of the blade is completed by a span-wise arranged series of sheet metal pockets or boxes, secured to the aft edge of the spar member, as non-structural attachments thereto. Centrifugal forces caused by the rotation of the blades set up bending moments in the blade due to the non-structural trailing edge pockets which lie aft of the center of gravity of the blade. As a result, the bending axis of the spar will tend to lie some distance ahead of the center of gravity of the blade particularly where the counterbalance for the non-structural pockets of the blade is incorporated in the leading edge of the spar as part of its structural mass.

In a rotary wing aircraft blade of this type, it is highly desirable for optimum flight performance to have the center of gravity of the blade spar, the bending axis of the spar, the aerodynamic center of the blade, the center of gravity of the blade and the feathering axis of the blade, coincident. Spars are fabricated today so that this coincidence can occur about the twenty-five percent chordline of the blade. During blade fabrication, when the non-structural trailing edge pockets are attached to the aft end of the blade spar, the center of gravity of the blade is shifted rearwardly of the bending axis (center of gravity) of the spar. This is undesirable since it would cause a twisting or torsional action in the blade during blade flapping motion and blade bending during rotation. To overcome these problems, a non-structural counterweight is placed in the forward part of the spar thereby establishing chordwise balance between the pockets and the counterweight to restore the blade center of gravity into coincidence with the spar center of gravity. Had this counterweight been made a structural part of the spar, such would have caused a forward shifting of the spar center of gravity and the spar bending axis, thereby failing to eliminate the aforementioned blade twist or torsion action during flapping motion. The non-structural counterweight performs a second function, namely, it counteracts or balances the centrifugal moments created by the non-structural pockets during blade rotation. If structural counterweights were used in the spar, such structural counterweights would be incapable of creating centrifugal moments about the bending axis of the spar to balance the centrifugal moments of the pockets.

In U.S. Patent No. 2,754,918, assigned to the assignee of this application, a construction is disclosed in which span-wise arranged weight members are provided adjacent the leading edge of the spar member for correcting the tendency of blades with non-structural pockets to bend forwardly in the plane of rotation due to the location of the center of gravity of the whole blade behind the bending axis of the leading edge spar member.

In U.S. Patent No. 2,754,917, an improved counterweight of this type is disclosed, however, the counterweight used in both of these patents must be retained in position against centrifugal force by a positioning member located at the tip of the blade. Since these prior art counterweights are retained in position at the tip of the blade, the centrifugal moment established by these counterweights is concentrated at the blade tip and is not distributed longitudinally along the blade so as to individually counteract the centrifugal moments established by each pocket. Because the centrifugal moment established by each pocket is not counteracted incrementally in the prior art counterweights, any one pocket bending moments can be partially compensated for only, and not fully eliminated, thus the blade bending caused by the centrifugal moments of the pockets will be reduced, but not eliminated. Further, experience has shown that when rotor blade tip damage occurs, the prior art counterweight retaining member may be damaged and lose its position, thereby permitting the loose counterweights to be flung by centrifugal force outwardly to cause damage to other parts of the aircraft and personnel, and to leave the blades in a condition of unbalance when such malfunction occurs during flight operation. Such malfunction also destroys the blade tip seal of the type taught in U.S. Patent No. 3,136,369.

It is an object of this invention to provide an improved non-structural weight member for a blade of this type which is bonded permanently to the interior of the spar to provide chordwise balance of the blade.

It is a further object of this invention to teach a rotary wing aircraft blade supported by a leading edge spar in which the spar center of gravity and bending axis are coincident with the blade center of gravity, aerodynamic center and feathering axis.

It is still a further object of this invention to teach a blade of this type in which a counterweight is permanently bonded to the spar interior so as to balance the non-structural pockets chordwise, thereby placing the center of gravity of the spar and the blade in coincidence, without affecting the spar bending axis, and wherein the counterweight also balances or counteracts the centrifugal moments established by the non-structural pockets during blade rotation.

It is still a further object of this invention to teach a counterweight for use in a blade of this type which will completely balance the blade pocket centrifugal moments throughout the length of the blade so that no blade bending occurs as a result thereof.

It is a further object of this invention to teach such a blade having optimum strength for minimum weight.

It is a further object of this invention to teach such a permanently bonded counterweight wherein the counterweight comprises at least one counterweight of selected weight which is selectively positioned within and attached permanently to the spar interior and which comprises a selectively proportioned mixture of weighted pellets and a cured adhesive compound.

It is a further object of this invention to teach such a permanently bonded counterweight wherein the counterweight is attached to the interior of the leading edge of the spar, thereby reducing the overall weight of the counterweight needed for chordwise balance of the blades.

It is a further object of this invention to teach such a bonded counterweight wherein the counterweight comprises a single member extending span-wise of the spar and which varies either in weighted pellet density or in counterweight size or volume in a constant weighted pellet density counterweight so as to produce optimum counterbalancing moments at the forward edge of the blade.

It is a further object of this invention to teach such a counterweight wherein additional counterweight retention parts and their attendant weight are eliminated.

It is a further object of this invention to teach such a counterweight which will be a non-structural member, but which will add to the rigidity of the leading edge of the blade with no increase in spanwise and chordwise stiffness.

It is still a further object of this invention to teach such a counterweight wherein counterweight installation time is a minimum and the counterweight is permanently installed.

It is still a further object of this invention to provide a rotor blade of this type having provision for adjusting the position of the center of gravity of the blade to coincide with the bending axis of the blade, the twenty-five percent chordline of the blade at which the feathering axis and the aerodynamic center of the blade are located. In blades of this type the blade or spar bending and torsional axes are substantially coincident.

These and other objects and advantages of the invention will be obvious from the following description of a preferred embodiment of the invention shown in the accompanying drawings. In these drawings:

FIG. 1 is a showing of a conventional helicopter rotor blade using our invention.

FIG. 2 is an enlarged perspective showing of a helicopter rotor blade using our invention showing a section on line 2—2 of FIG. 1.

FIG. 3 is a cross-sectional showing of a helicopter rotor blade taken along line 3—3 of FIG. 1.

FIG. 4 is a representation of a conventional helicopter rotor blade showing the location of the centers of gravity and the moment creating forces due to the non-structural counterweight and the non-structural trailing edge pockets.

FIGS. 5a, 5b and 6 are graphic representations of the chordwise bending moments illustrated in FIG. 4.

FIGS. 7, 8 and 9 are cross-sectional representations of typical helicopter rotor blades or helicopter rotor blade spars using our invention.

FIG. 10 is a cross-sectional showing of the forward edge of a helicopter rotor blade spar using our counterweight.

FIGS. 11 and 12 are sections taken along lines 11—11; 12—12 of FIG. 10 illustrating variations of our counterweight to produce varying spanwise moments.

FIGS. 13 and 14 are cross-sectional showings of helicopter rotor blades illustrating the function of the counterweight and why it has to be non-structural.

As best shown in FIG. 1, the rotor blade 100 consists essentially of an extruded spar member 10 which extends from the root to the tip of the blade and comprises the main strength member as well as the leading edge portion of the blade. Referring to FIGS. 2 and 3, it will be noted that the spar 10 forms a substantial chordwise portion of the blade and conforms to the airfoil contour thereof. The remainder of the chordwise extent of the blade is made up of V-shaped metal pockets, or boxes 12, the upper and lower forward edges 14 and 16 of which are adhesively secured to rabbets 18 formed along the upper and lower after edges of the spar. As shown in FIGS. 1, 2 and 3, each of the pockets 12 is virtually a separate metal box having ribs 20 which form enclosures therefor. The ribs are provided with stiffening dimples 22 and are also provided with upper and lower out-turned flanges 24 which are adhesively secured to the upper and lower surface sheets of the pockets and to a forward flange 26 which is adhesively secured to the vertical after face 28 of the web 30 forming the after wall of the tubular spar. The ribs 20, being located inwardly from the edge of the pockets by the width of flanges 24, form confronting recesses for the purpose of receiving a block of resilient material (not shown) between adjacent pockets which seal the gaps between pockets. The spar 10 has an inside opening of constant cross section; however, the wall thickness varies uniformly along its length; being the thinnest at the outboard end. The root end fitting 38 has upper and lower furcations which mechanically fasten to the spar, forming part of the blade 100. The blade 100 is then supported on the rotor hub by a root attaching fitting 36. The outboard end of the blade is completed by an end cap 40 which forms a closure for the hollow spar as well as for the end of the last trailing edge pocket.

Our counterweight 50 is permanently bonded to the hollow interior 52 of spar 10 along the inner surface 70 of the leading edge 53 thereof. Counterweight 50 preferably extends spanwise along the interior of the leading edge 53 of spar 10. Counterweight 50 may be of uniform density throughout its length or may be of variable density and also may be of uniform thickness throughout its length or may be of variable thickness as best suited to perform its counterweight function.

The blade counterweight function so obtained is best illustrated in FIGS. 4, 5 and 6. As best shown in FIG. 4, counterweight 50 produces incremental centrifugal moment creating forces R, S, T, etc., due to its bond to the leading edge of the spar and the pockets 12, which are also bonded to the spar but are unattached to one another, contribute other incremental moment creating forces A, B and C, etc., one for each pocket. The total moment due to R, S, T, etc., acting forward of the bending, or torsional, axis 54 of the spar will cause the blade to bend backwardly, and the sum of the moments created by A, B and C, etc., acting rearward of the axis 54 will cause the blade to bend forwardly. Therefore, the larger of the total moments along the blade will determine the blade position, as can be seen in exaggerated form in FIGS. 5a and 5b.

In view of the fact that counterweight 50 is permanently bonded to the spar interior, along the length or span of the spar, counterweight 50 establishes the aforementioned incremental centrifugal moment creating forces such as R, S and T, which can easily be established to exactly cancel the pocket created centrifugal moments created by A, B and C. The moments established by such a counterweighted blade are illustrated in FIG. 6 and it will be noted that the resulting moment established by the counterweights and the pockets is zero. Accordingly, blade bending due to pocket created centrifugal moments can be completely eliminated by the use of our bonded counterweights 50. It will be evident to those skilled in the art that blade bending may still occur due to unrelated loads such as drag and torsional loads.

In FIG. 3, the balanced relationship of the whole blade is indicated for a typical cross-section of the blade. Thus, the moment about axis 54 of the weight of the counterweight 50 acting through its moment arm X about the feathering or torsional axis 54 of the spar equals the moment of the weight of the pockets 12 acting through its moment arm Y. Thus the bending axis and the center of gravity of the whole blade, where the spar is the structural member of the blade, are one and the same and the blade in rotating will have no tendency to bend forward in its plane of rotation due to the presence of the non-structural pockets 12. In the NACA 0012 blade illustrated the aerodynamic center and axis 54 occur at the twenty-five percent chord.

For further particulars with respect to the construction of the blade and the spanwise moments acting thereon, reference may be had to U.S. Patent Nos. 2,754,917 and 2,754,918 which are hereby incorporated by reference.

As has been previously emphasized, it is essential that counterweight 50 be permanently bonded to the interior of spar 10 and that it be a non-structural member. If counterweights 50 were a structural member, such as would be the case if molten metal were poured into the leading edge of the spar and permitted to solidify, the counterweight would then become a structural part of the spar and would shift the center of gravity of the spar and bending axis of the spar forward of the blade aerodynamic center, center of gravity and feathering axis. This would be highly undesirable since it would fail to correct torsional or twisting moments in the blade during blade flapping motion. In addition, if the counterweight were made a structural part of the spar, it would be incapable of creating a centrifugal moment during rotation to counteract such centrifugal moments created by non-structural pockets 12.

This is best illustrated in FIG. 13 in which it will be noted that the spar center of gravity A, bending axis B and the blade center of gravity E, aerodynamic center C and feathering axis H are coincident. During the fabrication of blade 10, when pockets 12 are bonded to the aft end of spar 10, because the pocket center of gravity D is aft of the spar center of gravity A, the addition of the pockets to the spar will cause the blade center of gravity E to shift rearwardly to phantom position E', thereby taking the blade center of gravity E and the spar center gravity A out of coincidence. This would establish twisting or torsional moments in the blade when the blade attempted to flap during blade rotation. To bring the blade center of gravity E back into coincidence with the spar center of gravity A, counterweights 50 are added to provide chordwise balance for the pockets 12 and thereby bring the blade and spar centers of gravity back into coincidence to eliminate the aforementioned twisting motion in flight. Since counterweights 50 are fabricated to be nonstructural, they are not only capable of placing blade 100 in chordwise balance, but are also capable of counteracting the centrifugal moment created by the nonstructural pockets 12 during blade rotation.

Had a structural counterweight been incorporated into the leading edge of spar 10, as best illustrated in FIG. 14, the effect thereof would have been to shift the spar center of gravity A and bending axis B forwardly and out of coincidence with the blade center of gravity E, thereby establishing the aforementioned twisting or torsional blade motion during blade flapping movement. In addition, had a structural counterweight been added to spar 10 as shown in FIG. 14, such a counterweight being an integral part of spar 10, would be incapable of producing centrifugal moments such as R, S and T shown in FIG. 4 to counterbalance such centrifugal moments A, B and C created by non-structural pockets 12 during blade rotation.

The counterweight 50 relies on the use of heavy particles, such as lead shot, to give it a high density, as desired to produce a compact counterweight. To retain these particles an adhesive is used. This adhesive separates the particles slightly, and holds them together and binds them to the spar. However, this holding action is flexible, resulting in a counterweight whose modulus of elasticity is in the order of one percent of the modulus of elasticity of the structural material of the spar, so that the counterweight is, by virtue of its extreme flexibility, unable to react any appreciable portion of the loads reacted by the spar. The counterweight is thus securely attached to the spar, and yet is a non-structural member.

It is an important teaching of our invention that the interior of spar 10 form a portion of the mold in which the counterweight 50 is going to be formed so that counterweight 50 will eventually be permanently bonded to the interior of spar 10.

Some types of spars in which the counterweight 50 can be used in rotary wing aircraft are illustrated in FIGS. 7–9.

FIG. 7 illustrates a closed end spar 10 and the compound to produce our counterweight 50 would be introduced into the interior of this spar by the use of appropriate tooling prior to assembly of the blade tip seal (not shown) and the tip cap 40. For instance, the uncured compound to produce counterweight 50 could be introduced through an appropriately contoured syringe or injection device using pressure-vacuum methods, for example, into the interior of spar 10. Further, if it were desired to place counterweight 50 in the same position as shown in U.S. Patent No. 2,754,917, it would be possible to produce such a counterweight with our invention by placing appropriate dams 60 and 62 spanwise within the interior 52 of spar 10 on opposite sides of interior ribs 64 and 66. It will be noted that the dams 60 and 62 and the interior surface 70 of spar 10 now form a mold into which uncured counterweight compound may be introduced. Preferably, a third dam (not shown) will extend chordwise within the interior 52 of spar 10 and engage dams 60 and 62 so that, with spar 10 standing on end, the uncured counterweight compound may be poured into the mold formed by the dams and the spar interior surface 70.

Our invention lends itself more readily to use in open ended spars of the type shown in FIGS. 8 and 9. Considering FIG. 8 we see spar forward portion 72 and spar after portion 74 joined at joint 76 and supported by spar interior member 78. Before portions 72, 74 and 78 are so joined, preferably by adhesives, with forward portion 72 standing as shown in FIG. 10, it will be apparent that the uncured counterweight compound may be readily poured into the interior thereof.

A second type of open ended spar is shown in FIG. 9 wherein forward member 72 and after member 74 are joined by an I-beam member 80, to which they are bonded. In similar fashion, before members 72 and 74 are bonded to support member 80, forward spar portion 72 may be stood on end as illustrated in FIG. 10 and the uncured counterweight compound may be poured thereinto.

FIG. 11, which is a cross-sectional showing through FIG. 10, shows how counterweight 50 may be poured selectively to different depths throughout the spanwise dimension of the spar. This would be done to produce optimum moments at the leading edge of the spar to counteract the moments of the box members 12 at the after end of the blade. Dams 82 and 84 of selected height H and spaced a selected distance apart W and cooperate with the interior surface 70 of spar 10 to form the mold into which uncured counterweight compound is poured to produce counterweight 50a. Dams 86 and 88 of selected height H' and spaced a selected distance W' apart cooperate with the interior surface 70 of spar 10 to provide the mold to produce counterweight 50b. Void 73 is formed between counterweights 50a and 50b. It will be obvious that the construction shown in FIG. 11 produces selected blade spanwise movement variation.

A similar result of blade spanwise moment variation can be obtained as best shown in FIG. 12 by producing a one-piece counterweight 50 with pellet density varying selectively throughout its spanwise dimension.

Our counterweight 50 comprises a plurality of pellets, such as lead shot, positioned by an adhesive, which counterweight in turn is bonded to the interior 70 of spar 10. As used, herein, the term pellet can describe an object of spherical shape or any other shape, such as wires of any selected length and including wires which may extend for the full longitudinal length or span of the counterweight.

The procedure for preparing the counterweight mixture and bonding it as required will now be described.

Preferably, the weighted pellets 90, shown in FIG. 12, are number 8 size lead shot. .090" diameter spheres. Pellets 90 are first degreased with a solvent such as methyl-ethyl-ketone and then etched with a fluoroboric acid, a lead acid cleaner, then water rinsed and oven dried. The pellets 90 are then primed or coated with a priming compound such as EC 1945, made by the Minnesota Mining and Manufacturing Company of St. Paul, Minn., air dried and cured in an over for one hour at about 160° F. The interior surface 70 of spar 10 to which counterweight 50 is to be permanently bonded is cleaned, primed and cured. A good cleaner for surface 70, if spar 10 is of aluminum alloy, is methyl-ethyl-ketone. The primer for surface 70 may be the primer EC1945 and the curing process would also be for about one hour at about 160° F. The primer is used on both the lead shot 90 and surface 70 to obtain a better adhesion between the bonding surface, the pellets, and the adhesive compound.

The lead shot so cleaned, primed and cured, is then mixed with an adhesive substance or compound such as EC 2181, made by the Minnesota Mining and Manufacturing Company of St. Paul, Minn., which is an elastomer made from a copolymer compound. The adhesive substance could also be epoxy, rubber, butyl or rubber flexibilized polyester. The lead shot is preferably mixed with the adhesive compound such that there is one part by weight of adhesive compound and 13.3 parts by weight of the lead pellets, thereby producing a mixture having density of .25 pound per cubic inch. It has been found that this produces complete lead shot immersion in the adhesive. The adhesive compound may be preheated for about 10 minutes at 140° F. to make it less viscous before mixing with the primed and cured lead shot. It is recommended that the mixture of lead shot and uncured adhesive compound be heated to 140° F. for about 10 minutes to make it less viscous before pouring into the mold cavity formed by the interior surface 70 of spar 10 and dams such as 82 and 84. It may be desirable to heat spar portion 72 to produce better working of the uncured counterweight compound.

It has been found that the uncured counterweight compound so produced is readily workable for a period of approximately two hours.

No special tools are necessary for pouring the uncured counterweight compound into the interior of spar 10 as shown in FIGURE 10. A simple spreader may be used to level off the top of the uncured counterweight mixture between blocks 82 and 84 in conventional screed fashion.

After the uncured counterweight compound has been placed in selected position within the interior 52 of spar 10 along surface 70 thereof and between dams such as 82 and 84, the compound is preferably heated for about one-half hour to 140° F. by placing the entire spar into a heating oven. This is to make the compound less viscous to allow entrapped air bubbles to escape and to provide good adhesive coverage and wetting of the interior surface 70. The oven temperature is then raised to 350° F. for one hour to cure the adhesive compound to a durometer of about 45–60 and to produce counterweight 50 and cause it to be permanently bonded to the interior surface 70 of spar 10.

Dams such as 82 and 84 are made from material such as silicone rubber to make them easily removable from spar 10 after the counterweight has been cured because of the non-adhesive quality of the silicon rubber.

The amount of uncured counterweight mixture required is predetermined by calculation. Since the blade must be balanced about the twenty-five percent chordline, moments of all weights are taken about the twenty-five percent chord to establish the amount of counterweight compound necessary.

A sample calculation as to how the amount of uncured counterweight compounds is determined follows:

Referring to FIGURE 3, let us consider the process followed in determining the weight of counterweight 50 required to counterbalance the amount created by a single pocket 12. Each pocket 12 is made to a specified weight and a center of gravity. The distance from the feathering axes (25% chord) to the back wall 28 of the spar is known. The distance from the pocket forward flange 26 to the center of gravity of the pocket is also known. The sum of these distances establishes moment arm Y, shown in FIGURE 3. The approximate location of the C. G. of the counterweight to the feathering axis is known. This distance is shown as X in FIGURE 3. To obtain balance around the feathering axis, the forward moment must equal the rearward moment. In other words, the counterweight times the distance X must equal the pocket weight times the distance Y. In mathematical terms (CWT)(X)=(Pocket weight)(Y). The only unknown is the weight of counterweight 50. Solving for counterweight:

$$CWT = \frac{(\text{Pocket weight})(Y)}{X}$$

The answer is in lbs. per foot since the pocket weight is also in lbs. per foot. In this fashion we determine the weight or amount of counterweight 50 required to balance a particular pocket 12. This process is repeated for each pocket to determine the total weight of counterweight 50 required to balance all pockets 12.

Other methods of determining weight or counterweight moment required could also be used. For example, since the shape of the counterweight section is not a simple geometric figure or shape, it is also feasible to predetermine the counterweight moment CWT·X as a function of CWT (in lb./ft.) and then select a value of CWT to provide a moment matching pocket weight moment. A graph showing counterweight moment CWT·X against CWT could be plotted. In the alternative, having determined CWT, we can redetermine X accurately and compare with assumed X and make adjustments as required for accuracy.

By following the method outlined above, counterweight 50 is permanently bonded to the interior 70 within the cavity 52 of spar 10 and constitutes a non-structural member thereof. Such a counterweight will produce moments forward of the twenty-five percent chordline of the blade to balance the moments created by the trailing edge pockets aft of the twenty-five percent chordline, thereby producing chordwise balance within the blade.

It is to be understood that the invention is not limited to the specific embodiments herein illustrated and described but may be used in other ways without departure from its spirit as defined by the following claims.

We claim:

1. A blade for a rotary wing aircraft including a hollow leading edge, a counterweight bonded into said hollow leading edge and selectively positioned therein, said counterweight comprising a mixture of weight pellets and a bonding material and being structurally separate of said leading edge.

2. A blade for a rotary wing aircraft comprising a hollow spar the outer surface of which conforms to the airfoil contour of the blade chordwise from the leading edge thereof aft a distance greater than a quarter of the chord of the blade, said spar comprising the primary structural member of said blade, a plurality of non-structural trailing edge members attached to said spar to complete the airfoil contour of the blade, and weight means comprising weight pellets and a bonding material bonded to the interior of said spar ahead of said quarter chord distance of said blade, said weight means being structurally separate of said spar.

3. A rotor blade comprising a tubular spar, non-structural fairing means secured to the trailing edge of said spar for completing the blade chordwise, and one or more non-structural balancing weights selectively positioned and permanently bonded within said spar to counteract the centrifugal moment of said fairing means, and wherein said weights comprise a mixture of weight pellets and bonding material.

4. Apparatus according to claim 3 wherein the size and hence weight of said weights varies to produce optimum centrifugal moment counteraction.

5. Apparatus according to claim 3 wherein the density of pellets within said weights is varied to produce optimum centrifugal moment couteraction.

6. A blade for a rotary wing aircraft comprising load carrying apparatus extending along the blade span and defining a hollow portion therewithin, a counterweight bonded into said hollow portion and selectively positioned therein, said counterweight comprising a mixture of weight pellets and a bonding material and being structurally separate of said apparatus.

7. A rotor blade comprising a tubular spar, non-structural fairing means secured to the trailing edge of said spar for completing the blade chordwise, and one or more non-structural balancing weights selectively positioned and permanently bonded within said spar to counteract the centrifugal moment of said fairing means, and wherein said balancing weight in a single weight permanently bonded to the leading edge of said spar interior and comprising a mixture of weight pellets and bonding material extending spanwise within said spar and varying in chordwise dimension to produce optimum centrifugal moment counteraction.

8. A rotor blade comprising a tubular spar, non-structural fairing means secured to the trailing edge of said spar for completing the blade chordwise, and one or more non-structural balancing weights selectively positioned and permanently bonded within said spar to counteract the centrifugal moment of said fairing means, and wherein said balancing weight is a single weight permanently bonded to the leading edge of said spar interior and comprising a mixture of weight pellets and bonding material extending spanwise within said spar and varying in pellet density to produce optimum centrifugal moment counteraction.

9. A rotor blade comprising a tubular spar, aerodynamic fairing means secured to said spar for completing the blade chordwise, and one or more non-structural balancing weights selectively positioned and permanently bonded within said blade to counteract the centrifugal moment of said fairing means, and wherein said weights comprise a mixture of weight pellets and bonding material.

10. Apparatus according to claim 9 and wherein said weights vary in chordwise dimension to produce optimum moment counteraction.

11. Apparatus according to claim 9 and wherein said weights vary in pellet density to produce optimum centrifugal moment counteraction.

12. The method of producing a bonded counterweight in a hollow spar of a blade for a rotary wing aircraft comprising the steps of producing a mixture of weighted pellets and an uncured adhesive, then selectively positioning the mixture within the spar, then curing the adhesive so that the pellets are permanently positioned and bonded together to produce a counterweight permanently bonded to the spar as a non-structural member.

13. The method of producing a bonded counterweight in a hollow spar of a blade for a rotary wing aircraft comprising the steps of producing mixtures of weighted pellets and an uncured adhesive so that the mixtures are of different density, then selectively positioning the mixtures within the spar interior, then curing the adhesive so that the pellets are permanently positioned and bonded together to produce a counterweight permanently bonded to the spar as a non-structural member.

14. The method of producing a bonded counterweight in a hollow spar of a blade for a rotary wing aircraft comprising the steps of producing a mixture of weighted pellets and an uncured adhesive, then placing selected quantities of the mixture at selected locations within and against the spar interior, then curing the adhesive so that the pellets are permanently positioned and bonded together to produce at least one counterweight permanently bonded to the spar as a non-structural member.

15. The method of producing a bonded counterweight in a hollow blade portion comprising the steps of first forming a mixture of heavy pellets and an uncured adhesive so that all pellets are immersed in adhesive, the second step of positioning the mixture at selected locations within and against the hollow blade portion, and the third step of curing the adhesive so that the pellets are permanently positioned and bonded together to produce a counterweight permanently bonded to the hollow blade portion as a non-structural member.

16. The method of producing a bonded counterweight in a hollow blade portion comprising the steps of first forming a mixture of lead shot and an uncured adhesive compound so that all shots are immersed in adhesive compound, the second step of positioning the mixture at selected locations within and against the hollow blade portion, and the third step of heating the hollow blade portion and mixture to cure the adhesive compound so that the lead shot is permanently positioned and bonded together to produce a counterweight permanently bonded to the hollow blade portion as a non-structural member.

17. The method of producing a bonded counterweight in a hollow blade portion comprising the steps of cleaning and priming with an elastomer primer selected quantities of lead shot and selected interior surfaces of the hollow blade portion, forming a mixture of the cleaned and primed lead shot and a selected quantity of uncured elastomer so that all shot is immersed in elastomer, positioning the mixture at selected cleaned and primed locations within and against the hollow blade portion interior, and heating the hollow blade portion and mixture to a selected temperature for a selected period of time to cure the elastomer so that the shot is permanently positioned and bonded together to produce a counterweight permanently bonded to the hollow blade portion as a non-structural member.

18. The method of producing a bonded counterweight in a hollow blade portion comprising the steps of cleaning and priming with an elastomer primer selected quantities of lead shot and selected interior surfaces of the hollow blade portion, forming a mixture of the cleaned and primed lead shot and a selected quantity of uncured elastomer so that all shot is immersed in elastomer, selectively positioning dams against the interior of the hollow blade portion at cleaned and primed locations to form an open ended mold therewith, positioning the mixture within the mold, and heating the hollow blade portion and mixture to a selected temperature for a selected period of time to cure the elastomer so that the shot is permanently positioned and bonded together to produce a counterweight within the mold which is permanently bonded to the hollow blade portion as a non-structural member.

19. The method of producing a bonded counterweight in a hollow blade portion comprising the steps of cleaning and priming with an elastomer primer selected quantities of lead shot of about .090" diameter and selected interior surfaces of the hollow blade portion, forming a mixture of the cleaned and primed lead shot and a selected quantity of uncured elastomer of a consistency of about one part by weight of uncured elastomer and 13.3 parts by weight of lead shot so that all shot is immersed in uncured elastomer, selectively positioning dams against the interior of the hollow blade portion at cleaned and primed locations to form an open ended mold therewith, positioning the mixture within the mold, and heating the hollow blade portion and mixture to a selected temperature for a selected period of time to cure the elastomer so that the shot is permanently positioned and bonded together to produce a counterweight within the mold which is permanently bonded to the hollow blade portion as a non-structural member.

20. The method of producing a bonded counterweight in a hollow blade portion comprising the steps of cleaning and priming with an elastomer primer EC1945 selected quantities of lead shot of about .090" diameter and selected interior surfaces of the hollow blade portion, air drying and curing the primed lead shot and primed hollow blade portion for about one hour at about 160° F., forming a mixture of the cleaned, primed and cured lead shot and a selected quantity of uncured elastomer EC2181B so that all shot is immersed in uncured elastomer, selectively positioning dams against the interior of the hollow blade portion at opposite ends of cleaned, primed and cured locations to form an open ended mold therewith, positioning the mixture within the mold, and preheating the hollow blade portion and mixture to about 140° F. for about thirty minutes to insure good contact between the uncured elastomer and the primed and cured interior of the hollow blade portion, then heating the hollow blade portion and the mixture to about 350° F. for about sixty minutes to cure the elastomer so that the shot is permanently positioned and bonded together to product a counterweight within the mold which is permanently bonded to the hollow blade portion as a non-structural member.

21. The method according to claim 20 including the additional step of preheating the uncured elastomer for about ten minutes at about 140° F. before mixing with the primed and cured lead shot.

References Cited

UNITED STATES PATENTS

| | | | |
|---|---|---|---|
| 2,754,917 | 7/1956 | Kee | 170—159 |
| 3,055,437 | 9/1962 | Stack | 170—159 |

FOREIGN PATENTS

| | | |
|---|---|---|
| 744,437 | 2/1956 | Great Britain. |

MARTIN P. SCHWADRON, *Primary Examiner.*

EVERETTE A. POWELL, JR., *Examiner.*